Oct. 23, 1923.                                               1,471,971
                         W. D. MILLER
                 REVOLVING TELESCOPING DERRICK
                    Filed Oct. 4, 1921        4 Sheets-Sheet 2
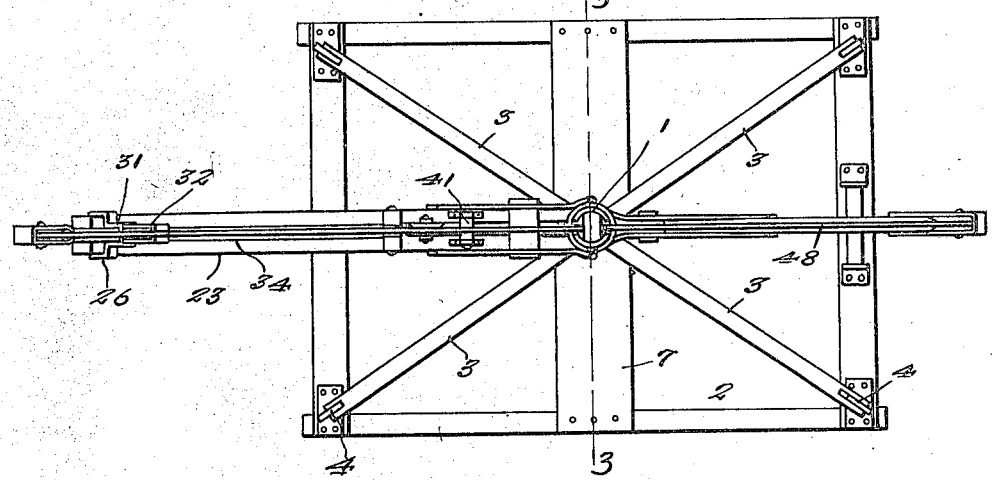
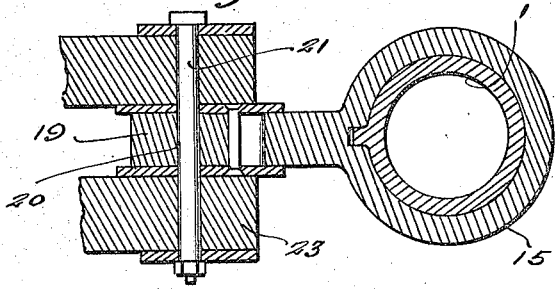
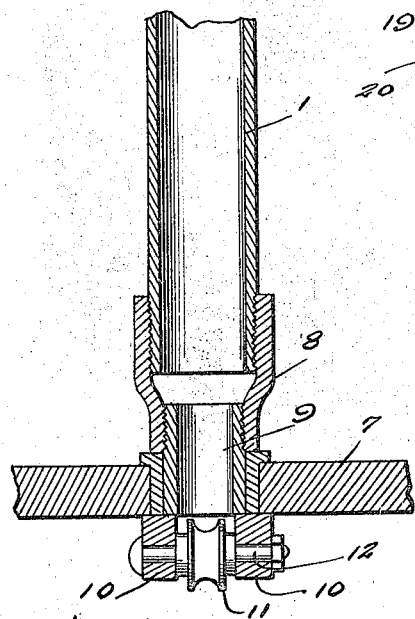
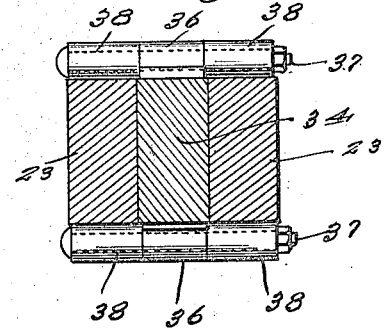
WITNESSES
R. A. Thomas
W. D. Miller, INVENTOR
BY
ATTORNEY

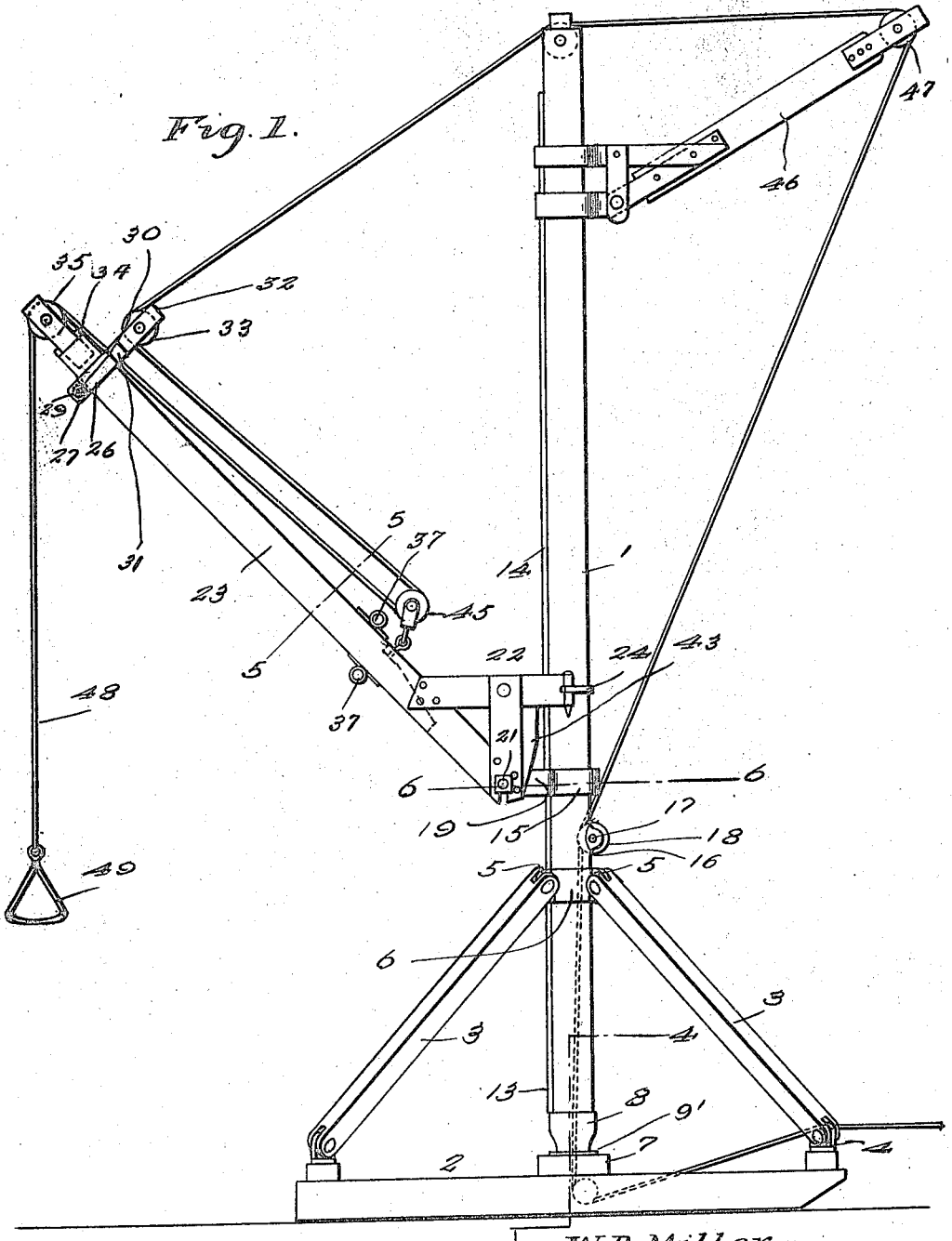

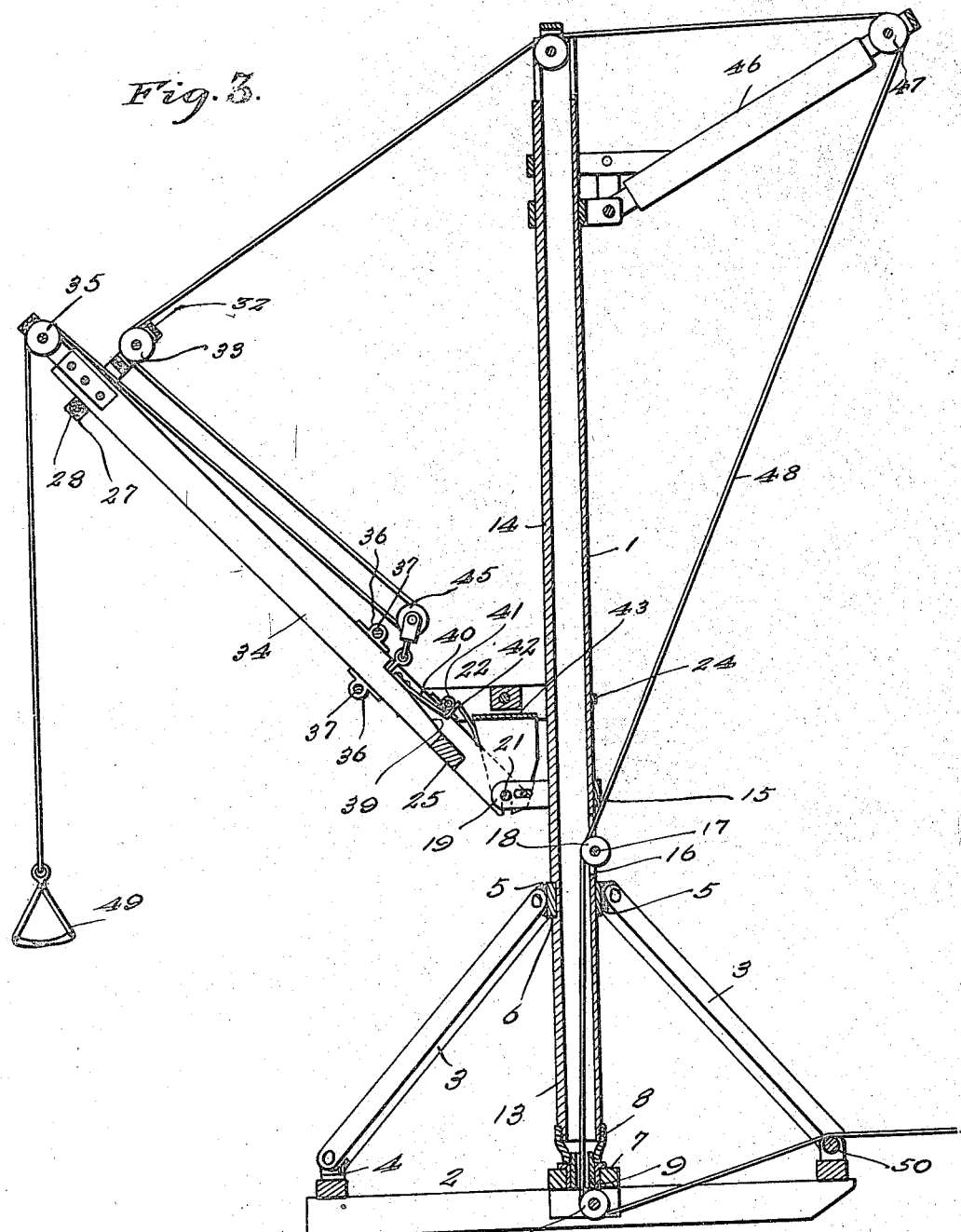

Oct. 23, 1923.
W. D. MILLER
1,471,971
REVOLVING TELESCOPING DERRICK
Filed Oct. 4, 1921      4 Sheets-Sheet 4
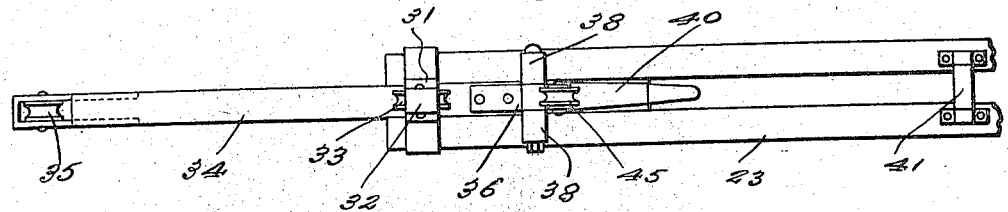
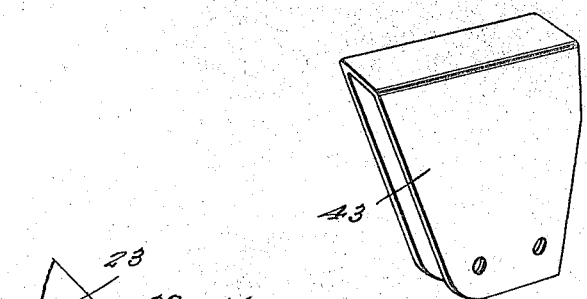
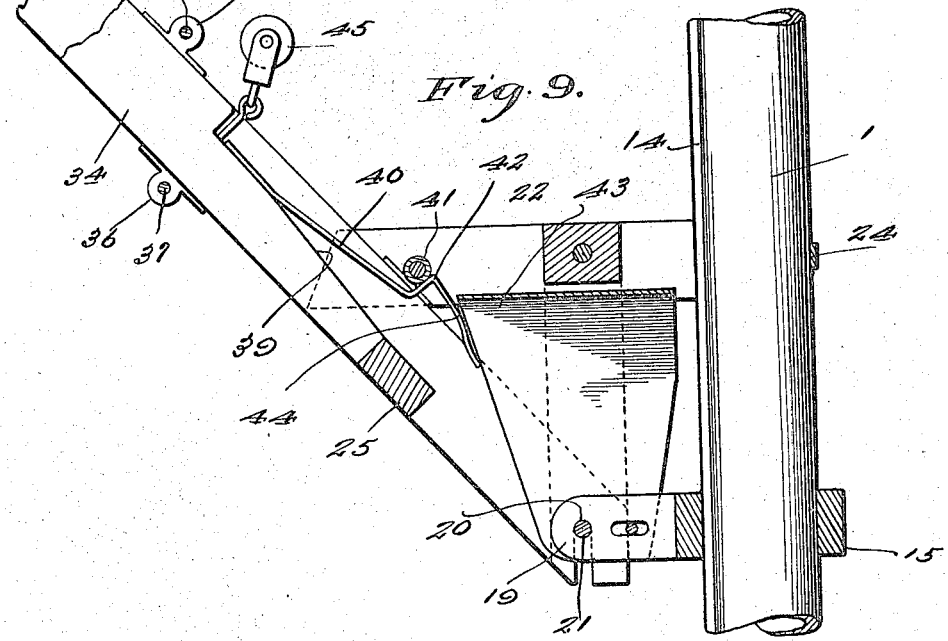
W. D. Miller INVENTOR Patented Oct. 23, 1923.

1,471,971

UNITED STATES PATENT OFFICE.

WILLIAM D. MILLER, OF MOUNT CARMEL, ILLINOIS.

REVOLVING TELESCOPING DERRICK.

Application filed October 4, 1921. Serial No. 505,301.

*To all whom it may concern:*

Be it known that I, WILLIAM D. MILLER, a citizen of the United States, residing at Mount Carmel, in the county of Wabash and State of Illinois, have invented new and useful Improvements in Revolving Telescoping Derricks, of which the following is a specification.

My present invention has reference to a means for elevating hay and depositing the same in a stack.

An object is to produce a means of this character by which hay or like material may be raised to desired elevations to produce a stack.

A further object is to produce a device of this character in which hay raised thereby may be turned on the device and stacked in different heaps adjacent to the device.

A still further object is to produce a hay elevating device in which a mast is suitably supported and has secured thereon a boom comprising telescopic sections, means being provided for normally latching the outer and movable boom sections on the inner and fixed section, the lifting cable for the hay being trained through the mast and the sections of the boom, and the fork on said cable designed, when brought into engagement with the outer member of the boom, to release the same from engagement with the inner member and permit the cable sliding the said member outwardly of the inner member, thus extending the outer member away from the inner member and permitting the hay to be elevated on and above that first stacked by the fork.

The foregoing and other objects which will appear as the nature of the invention is better understood, may be accomplished by a construction, combination and operative arrangement of parts such as is disclosed by the drawings which accompany and form part of this specification.

In the drawings:

Figure 1 is an elevation of a hay stacking apparatus employed with this invention.

Figure 2 is a top plan view thereof.

Figure 3 is a sectional view on the line 3—3 of Figure 2.

Figure 4 is a sectional view on the line 4—4 of Figure 1.

Figure 5 is a sectional view on the line 5—5 of Figure 1.

Figure 6 is a sectional view on the line 6—6 of Figure 1.

Figure 7 is a top plan view of the boom sections showing the inner slidable section in an extended position.

Figure 8 is a perspective view of the contact member.

Figure 9 is an enlarged view showing the relation of the telescopic boom sections with the mast.

As disclosed by the drawings, my improvement includes a mast 1. The mast is mounted on a suitable support 2, and between the support and the mast there are angle braces 3. Preferably the support is in the nature of a skid having its side members in the nature of runners, whereby the improvement may be transported by draft animals. The braces 3, as well as the mast, may be removable from the support, the braces in the present instance having their lower ends bifurcated to receive therein lugs 4 on the corners of the support, and passing through the said ends of the braces and the lugs are bolts which are engaged by nuts. The upper ends of the braces are also bifurcated and receive therethrough ears 5 on a collar 6 that surrounds the mast, suitable securing elements, such as bolts, engaged by nuts, passing through the upper ends of the braces and through the ears 5.

The mast 1 is hollow, being preferably in the nature of a tube, and the lower end thereof, which rests on the central transverse beam 7 of the support 2 is preferably secured in a reducing collar 8 that has screwed or otherwise secured in its reduced lower end a short tube member 9 that passes through a bearing 9' secured in a central rounded opening in the said beam 7. If desired, anti-frictional bearings may be provided between the bearing 9' and the short tube member whereby the mast may be readily revolved.

The under face of the beam 7 opposite the side walls of the opening in which the tube 9 is received, has secured thereon cleats 10, and between these cleats, to one side of the opening there is a sheave wheel 11 that has its shaft 12 journaled in bearings in the said cleats.

The tubular mast 1 is ribbed, as at 13 and 14, at points between the collars 8 and 6, and above the collar 6 at a point adjacent to the upper end of the said mast. The collar 6 rests on the upper end of the rib 13, and if desired the lower collar 8 may be contacted by the lower end of the said rib 13. The upper rib 14 is received in a groove in the bore of a sleeve 15 which locks the sleeve to the mast, and the said mast, directly below the sleeve 15, has a slot 16 in the side walls of which there is a shaft 17 on which is journaled a groove or sheave wheel 18. The sleeve 15, on the side thereof opposite the slot 16, is provided with an extension in the nature of a tongue 19 which receives therethrough a pivot 21. The boom comprises a telescopic section, and it is to a fixed section 23 that the frame 22 is secured. The frame 22 is really in the nature of angle members, one of which being secured on each side of the boom section 23, and the upper or horizontal elements of the said frame members have on their inner ends a strap 24 that is loosely arranged around the mast 1, upward of the slot 16 therein.

The fixed section 23 of the boom comprises two spaced bars or beams, spaced from each other at their lower or inner ends by the tongue 19 and outward of the said tongue by a spacing block 25. On the outer ends of the members comprising the boom section 23 there is a yoke 26 having its arms offset to underlie the beams or plates of the section 23, and from thence extended downwardly to provide ears 27. Between these ears there is a spacing roll 28, and passing through the openings in the ears and through the bore of the roll is a bolt member 29 which is engaged by a nut 30. The yoke thus holds the members of the fixed section 23 in spaced relation to each other at the upper and outer ends of the said section. The yoke has its arms also bent over the upper edges of the members of the section 23, but is continued outwardly therefrom in a line with the inner edges of the said sections to provide a bail-like portion 31, and to this bail there is swiveledly secured a substantially U-shaped member 32 between whose arms there is journaled a sheave wheel 33, the shaft of which finding bearings in the said arms of the bail.

The inner or movable section of the boom is indicated by the numeral 34 and is in the nature of a beam or bar of a size to be snugly received between the members comprising the fixed section 23, the outer or projecting end of the section 34 resting on the roller 28 and being disposed opposite the bail portion 31 of the yoke. The outer end of the section 34 carries a sheave wheel 35. Upon the upper and lower sides, and adjacent to the inner end of the section 34 there are secured bearings 36 respectively for shafts 37 respectively on whose ends there are journaled rollers 38 respectively, the said rollers contacting with the upper and lower edges of the members comprising the fixed section 23 of the boom. The boom section 34, inward and on upper edge thereof, is depressed or cut away as at 39, and secured to the said depression is the end of a spring latch 40. Between the members comprising the frame 22, directly above the fixed section 23 of the boom there is journaled in suitable bearings a roller 41 that is designed to be engaged by a hook 42 on the free end of the spring latch 40, and in this manner the slidable section 34 is held telescoped in the fixed section 23 of the boom.

Supported on the tongue 19 between the members that constitute the frame 22, directly below the roller 41 is a fixed contact member 43 whose outer edge is arranged at an inclination, and the beak 44 of the hook 42 is contacted by the said edge of the contact member when the section 34 is telescoped in the section 23 of the boom.

On the shoulder provided by the reduced or cut-away edge of the boom section 34 there is supported a sheave wheel 45.

Secured on the mast, diametrically opposite telescopic sections and held against movement in any desired or preferred manner, is an upwardly directed outwardly disposed arm 46 that carries at its outer end a sheave wheel 47.

A cable 48 having on its outer end a grab hook 49 is trained through the sheave wheel 35 on the end of the slidable or telescopic boom section 34, and is from thence directed through the bail 31 of the yoke 26 around the sheave wheel 45 secured adjacent to the inner end of the telescopic boom section 34. The cable is then directed around the sheave wheel 33, over the sheave wheel at the top of the mast, over the sheave wheel 47 on the end of the arm 46, from thence downward through the groove 16, over the groove or sheave wheel 18, through the mast and around the sheave wheel 11 at the bottom of the mast. The cable is directed through a sheave wheel 50 on the skid support 2 and to the end of the said cable the draft animals are attached. A draw upon the cable will elevate the grab hook, and the operator can readily turn the boom on the mast to deposit the load at a desired point with respect to the support 2. By slacking the cable the load will drop and be released from the grab hook. As the pile increases it is, of course, necessary that the hay be raised to a greater elevation, and in such instance the grab hook 49 is elevated until the same is brought into contact with the sheave wheel on the outer end of the telescopic section 34 of the boom, causing the said section to be swung and as a consequence causing the contact member 43 to engage with the beak 44 of the hook 42 to force the hook out of engagement with the roller 41, and thus release the latch 40 from engagement with the fixed section of the boom and allowing the telescopic or movable section 34 to be moved outwardly of the fixed section. This, of course, is accomplished by a proper pull of the draft animals on the end of the cable to which they are attached, and in accordance with the draw on the cable the outward movement of the section 34 through the section 23 of the boom is regulated. The section 34 is of a comparatively great length, so that a stack of a comparatively great height can be made by the improvement, which, in addition to the revoluble feature of the invention, is one of the important objects of my invention.

It is thought that the foregoing description, when taken in connection with the drawings, will amply set forth the construction and operation of the improvement to those skilled in the art to which this invention relates without further detailed description, but the nature of the invention is such that the same is naturally susceptible to changes and modifications, and therefore I am not to be restricted to the details of construction set forth in the description and disclosed by the drawings, but am entitled to all such changes therefrom as fall within the scope of what is claimed.

Having described the invention, I claim:—

In a hay derrick, a skid, a mast revolubly supported thereon, a boom pivotally secured to the mast, means between the boom and mast for holding the former at an inclination with respect to the latter, said boom comprising an outer section which is pivotally secured to the mast and an inner slidable section telescopically received in the outer section, latching means for holding the inner section within the outer section, an arm secured to the mast and arranged at an inclination diametrically opposite the telescopic sections, a hay elevating cable trained through the lower portion of the mast, over the end of the arm thence over the top of the mast then down to the slidable section adjacent its inner end, thence directed toward the free end of the pivoted section and trained through this last mentioned end and the outer end of the slidable section respectively, said cable when drawn to elevate hay will release the latching means and thereafter draw on the slidable section to move the same outwardly beyond the pivoted section as and for the purpose specified.

In testimony whereof I affix my signature.

WILLIAM D. MILLER.